United States Patent [19]

Okiyama

[11] 4,352,847

[45] Oct. 5, 1982

[54] TRANSFER FILM FOR USE IN ELECTROPHOTOGRAPHIC COPIERS

[75] Inventor: Toshiaki Okiyama, Tokyo, Japan

[73] Assignee: Fuji Photo Film Co., Ltd., Kanagawa, Japan

[21] Appl. No.: 140,400

[22] Filed: Apr. 14, 1980

[30] Foreign Application Priority Data

Apr. 13, 1979 [JP] Japan .................................. 54/44208

[51] Int. Cl.$^3$ ............................................... B32B 3/26

[52] U.S. Cl. .................................... 428/141; 428/195; 428/334; 428/335; 428/336; 428/409; 428/412; 428/419; 428/480; 428/913; 428/914; 430/950

[58] Field of Search ................ 156/153, 154; 264/162; 427/307; 428/141, 409, 411, 412, 419, 480, 195, 147, 334, 335, 336, 500, 913, 914; 430/126, 950; 346/134, 135.1

[56] References Cited

U.S. PATENT DOCUMENTS

| | | | |
|---|---|---|---|
| 3,271,229 | 9/1966 | Grabouez ............................ | 264/162 |
| 3,752,731 | 8/1973 | Stiegler et al. ...................... | 428/141 |

*Primary Examiner*—Bruce H. Hess

*Attorney, Agent, or Firm*—Sughrue, Mion, Zinn, Macpeak & Seas

[57] ABSTRACT

A transfer film for use in electrophotographic copiers comprising a matted plastic film having a UL temperature index of at least 120° C. and at least one side of which has a surface roughness of at least 1.0 micron.

11 Claims, 4 Drawing Figures

TRANSFER FILM FOR USE IN ELECTROPHOTOGRAPHIC COPIERS

BACKGROUND OF THE INVENTION

1. Field of the Invention

This invention relates to a transfer film for use in electrophotographic copiers.

2. Description of the Prior Art

Tracing paper has been widely used as a transfer paper for use in electrophotographic copiers. Such paper is not sufficiently high in dimensional stability, keeping quality, mechanical strength and water resistance, and if such properties are required, it is replaced by a transfer film formed from a matte film made of a polyethylene terephthalate (hereinafter referred to as PET resin) or cellulose triacetate resin (hereinafter referred to as CTA resin). However, to have the toner fixed adequately to the transfer film during transfer on an electrophotographic copier, the thermal fixing unit of the copier must be held at a high temperature, at least as high as 250° C., or even higher than 300° C. if the heating mechanism of the unit is of radiant-heating type. Accordingly, if the PET film or CTA film used as transfer film is not adequately resistant to high temperatures, it undergoes noticeable rippling (i.e., formation of waves on the surface) after thermal fixation, thus severely damaging the flatness of the surface, and shows a considerable degree of heat shrinkage. If the temperature at the thermal fixing unit is decreased to a level that does not cause rippling, the toner is fixed (i.e., adhered) to the film so weakly that it will easily separate from the film, thus making the film unsuitable for practical use. Further, even a heat resistant film of the aforementioned type does not provide satisfactory writing quality or adequate toner fixation. "Writing quality" refers to the ability of a transfer film to be written on with pencil, ink, or the like; this is an important property for a transfer film, in that it is often desirable to modify an image on a transfer film by ordinary writing thereon. In addition, the known types of transfer film are of such high transparency that it is difficult to detect them when stuck in the electrophotographic copier. Thus, the conventional method of using the interruption of light to detect a paper or film stuck in an electrophotographic copier fails to operate in the intended manner, and the copier will not stop even if the paper or film does become stuck.

SUMMARY OF THE INVENTION

Therefore, one object of this invention is to provide a transfer film free from the above-described defects of conventional paper and films.

Another object of this invention is to provide an improved transfer film for use in an electrophotographic copier of the type that generates a high temperature at the thermal toner fixing unit, wherein said film retains a high degree of flatness and freedom from rippling even after heating, exhibits extremely low heat shrinkage, assures strong fixation of the toner to the film, and provides high writing quality.

A further object of this invention is to provide an improved transfer film for use in electrophotographic copier which adds to the above-described properties a degree of opacity such that the film is easy to detect when it becomes stuck in the copier.

These and other objects are achieved in the present invention, wherein a transfer film for use in electrophotographic copier is provided comprising a matted plastic film having a UL (Underwriters Laboratories) temperature index of at least 120° C., and at least one side of which has a surface roughness of at least 1.0 micron.

Furthermore, the invention also includes a transfer film for use in electrophotographic copiers comprising a matted plastic film having not only the heat resistance and surface roughness defined above, but also having an opacity which is in the range of from 20 to 65%, as measured by the method defined in JIS P-8138.

Other advantages of this invention will be apparent from the following detailed description.

DETAILED DESCRIPTION OF THE INVENTION

Figure 1:
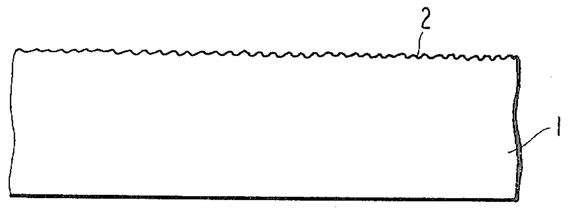
FIGS. 1 through 4 illustrate cross-sections of transfer films according to various embodiments of the invention for use in electrophotographic copiers.

It has been found in the present invention that if a film is made of plastic material having a UL temperature index of at least 120° C. (indicating the heat resistance properties of the material), it retains a high degree of flatness without rippling, exhibits extremely low heat shrinkage, and assures strong fixation of the toner to the film when copying is performed on an electrophotographic copier of the type that generates a high temperature at the thermal fixing unit.

It has also been found in the present invention that a film having at least one side thereof matted to a surface roughness of at least 1.0 micron: (1) allows the toner to cover all projections on the film surface and fill all recesses in the surface, thereby improving fixation of the toner to the film; and (2) provides high writing quality that permits its use not only as intermediates but also as a writing paper in general.

It has further been found in the present invention that a film prepared so as to have an opacity of from 20 to 65%, as measured by the method defined in JIS P-8138, not only has the feature (2) noted above, but also, like common paper, permits easy detection of a film stuck in the copier. Electrophotographic copiers such as the Xerox 3600, 2400, 9200 and 7200 (trade names) use the interruption of light to detect the presence of stuck paper, but this detection method does not cause the copier to stop when a transparent paper or film is stuck, because it fails to detect the transparent paper or film stuck in the copier. In contrast, the location of a transfer film according to the present invention having an opacity of from 20 to 65% can be easily determined if it is stuck in the copier.

The "UL temperature index" as used herein means a temperature measured by the method defined in UL 746-B, and it is conventionally used as an index indicating the heat resistance of plastics. For example, the Modern Plastics Encyclopedia, 1978–1979 Edition, pp. 617–632 gives the UL temperature indexes of various plastics.

Surface roughness can be determined by a number of methods. One such method is JIS B-0601-1976. In the examples described below, the surface roughness value was obtained first by resolving the deflection of the indicator of a surface roughness meter (SURFCOM-3B (trade name) manufactured by Tokyo Seimitsu Co., Ltd., Japan) into X- and Y-axis components, magnifying said components by 7,000 times, projecting the magnified image directly onto a plane, taking a picture of the projected image, and finally dividing the recorded maximum roughness by the magnification power.

Illustrative plastics having a UL temperature index of at least 120° C. and suitable for use in this invention include polysulfone resin, polyether sulfone resin, polyarylate resin (thermoplastic aromatic polyester resin), chlorinated polycarbonate resin, polyimide resin, and poly(parabanic acid) resin.

A typical example of the polysulfone resin is Udel, the trademark for a resin manufactured by Union Carbide, U.S.A., having the formula

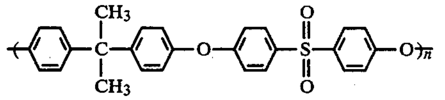

where n=50 to 80 and a UL temperature index of about 140° C. A typical example of the polyether sulfone resin is Victrex, the trademark for a resin manufactured by Imperial Chemical Industries, England, having the formula

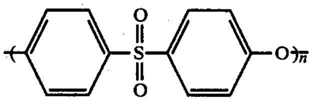

and a UL temperature index of about 170° C. A typical example of the polyarylate resin is U-Polymer, the trade name for a resin manufactured by UNITIKA Ltd., having the formula

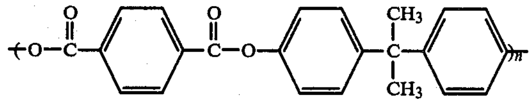

and a UL temperature index of about 130° to 140° C. A typical example of the polyimide resin is Kapton, the trademark for a resin manufactured by Du Pont, U.S.A., having a UL temperature index of about 210° C. A typical example of the poly(parabanic acid) resin is Tradlon, the trademark for a resin manufactured by Esso Chemical, U.S.A., having the formula

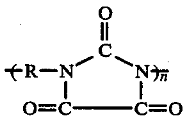

and a UL temperature index of about 170° to 180° C. It is to be noted here that the polyimide resin and poly(-parabanic acid) resin are amber-colored and not so preferred for use in transfer film as the other resins listed above.

The film can be made from these heat resistant resins by casting a solution of these resins in an organic solvent on a rotating drum or an endless band, or by melt extrusion in which the resin is hot-extruded into a film. The two methods each have their own advantages and disadvantages: solution casting provides a film of uniform thickness which is free from fish eyes (unmelted parts), but the film contains a small amount of the residual solvent; on the other hand melt extrusion provides a film with no residual solvent but it may contain fish eyes and have some nonuniformity in thickness.

If the film is extremely thin, it will wrinkle when passed through an electrophotographic copier, and is therefore awkward to handle. Conversely, if the film is too thick, it is difficult and uneconomical to store it in large quantities. For this reason, the thickness of the film is preferably between about 25 and 100 microns, and more preferably in the range of from 35 to 80 microns.

The film is matted to give a surface roughness of at least 1.0 micron. Illustrative matting methods include (1) band matting, wherein a solution of resin is directly cast on a satin-finished or matte-finished drum or endless belt of a casting machine to produce a matte film; (2) sandblasting wherein a transparent film on a take-up roll is sandblasted to give a matte finish; (3) surface saponification wherein a transparent film is immersed in an alkaline saponifying solution to give the film a matte finish; and (4) coating wherein a solution containing a matting agent and binder is coated onto a transparent film to provide a matte layer. Any of these techniques may be used in the practice of this invention. The matte film thus prepared of this invention is required to have a surface roughness of at least 1.0 micron. A film having a surface roughness less than 1.0 micron has essentially no writing quality and is therefore unsuitable for general use as a transfer film. The desired surface roughness may be obtained by properly controlling, for example, the roughness of the band surface in band matting or the grain size of sand to be blasted, and suitable conditions in each of these matting techniques will be easily determined by those skilled in the art.

The film may be rendered opaque by any of the matting methods described above. Alternatively, titanium oxide, zinc oxide, silicon dioxide and other pigments may be incorporated as a filler in the matted film. The opacity of the film is preferably between 20 and 65%, more preferably between 25 and 55%, as measured by the method defined in JIS P-8138. If the film is less opaque than the indicated range, it cannot be detected even if it is stuck in the electrophotographic copier. If the film is more opaque, its performance as intermediate film to produce a copy is not satisfactory.

Thus, a matted plastic film having a UL temperature index of at least 120° C. and at least one side of which has a surface roughness of at least 1.0 micron is prepared according to this invention. As is described in the following examples, when a transfer film comprising such film was passed through an electrophotographic copier of the type that generates high temperature at the thermal fixing unit for fixing the toner, e.g., Xerox 2080 (trade name for a copier for copying large-size drawings, manufactured by Fuji Xerox Co., Ltd.), it was free from rippling, retained a high degree of flatness and dimensional stability, provided strong fixation of the toner to the film, and provided high writing quality. As a further advantage, a transfer film of this invention having an opacity between 20 and 65% could be detected very easily when it became stuck in the copier.

Figure 2:
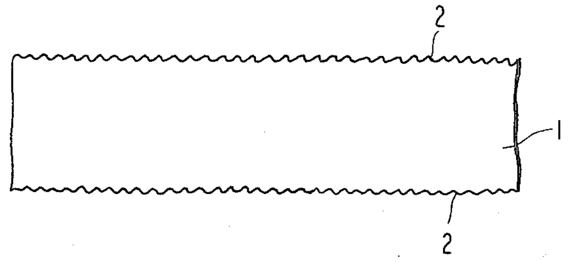
Figure 3:
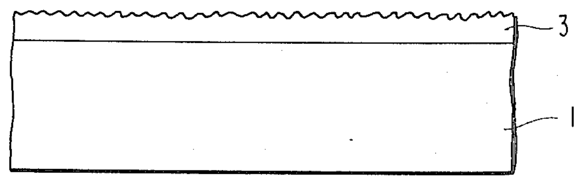
Figure 4:
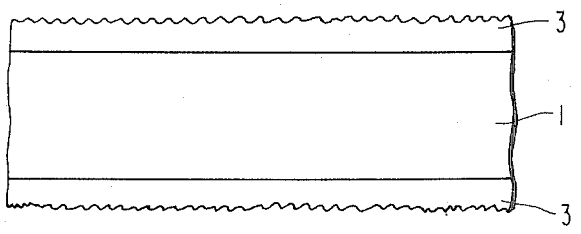

The transfer film of this invention for use in electrophotographic copier is now described by reference to the drawings wherein FIGS. 1 to 4 are each a cross section of the film according to a different embodiment of this invention. In each figure: 1 is a plastic film having a UL temperature index of at least 120° C.; 2 is the matted side of the film having a surface roughness of at least 1.0 micron (see FIGS. 1 and 2 and Examples 1 and 2 below); and 3 is a matted layer having a surface roughness of at least 1.0 micron and coated onto either one (see FIG. 3) or both (see FIG. 4 and Example 3 below) sides of the film.

The invention will hereunder be described in greater detail by reference to the following examples, wherein the performance of the film was evaluated as follows:

"Rippling"—If visual inspection showed the presence of noticeable ripples on the film surface, the film was "unsuitable".

"Dimensional change"—If the heat shrinkage in either the "longitudinal" or the "transverse" direction was less than 0.1%, the film was "good"; otherwise, it was "unsuitable".

"Toner fixation"—If the bond between the toner and the film was such that rubbing of the film surface lightly with a finger did not cause the toner to come off the film, the film was "good"; if the toner came off, the film was "unsuitable".

EXAMPLE 1

Udel (the trademark for a polysulfone resin manufactured by Union Carbide, U.S.A., having a UL temperature index of about 140° C.) was extruded to form a film 75μ thick. One side of the polysulfone film was sandblasted to give a matte finish having a surface roughness of 4.5μ. The resulting transfer film for use in electrophotographic copier had an opacity of 47.2%. The performance of the film was compared with that of the conventional PET matte film used as an intermediate and with an unmatted polysulfone film. The results are shown in Table 1 below.

TABLE I

| | Polysulfone Matte Film | PET Matte Film | Unmatted Polysulfone Film |
|---|---|---|---|
| Thickness (μ) | 75 | 75 | 75 |
| Matte Surface Roughness (μ) | 4.5 | 5.2 | 0.6 |
| Opacity (%) | 42 | 45 | Measurement Impossible |
| Rippling | o | x | o |
| Dimensional Change (%): | | | |
| Longitudinal | 0.01 | 0.80 | 0.02 |
| Transverse | 0.00 | 0.20 | 0.01 |
| Evaluation | o | x | o |
| Toner Fixation | o | x | Δ |
| Writing Quality | o | o | x |
| Ease of Detecting a Stuck Film | o | o | x |
| Overall Evaluation | o | x | x |

o: Good (acceptable)
Δ: Fair
x: Unsuitable

EXAMPLE 2

20 parts by weight of Victrex (the trademark for a polyether sulfone resin manufactured by Imperial Chemical Industries, England, having a UL temperature index of about 170° C.) was dissolved in 80 parts by weight of a mixture (1:1) of methylene chloride and chloroform. The solution was cast on a satin-finished casting band (the roughness of the band surface was about 8μ) to form a transfer film having a thickness of 50μ, a surface roughness of 5.4μ, and an opacity of 35%. The performance of the film was compared with that of the conventional matted and unmatted cellulose triacetate (CTA) films.

The results are indicated in Table II below.

TABLE II

| | Polyether Sulfone Matte Film | CTA Matte Film | Unmatted CTA Film |
|---|---|---|---|
| Thickness (μ) | 50 | 50 | 50 |
| Matte Surface Roughness (μ) | 5.4 | 5.6 | 0.1 |
| Opacity (%) | 29 | 31 | Measurement Impossible |
| Rippling | o | x | x |
| Dimensional Change (%): | | | |
| Longitudinal | 0.02 | 1.2 | 1.3 |
| Transverse | 0.01 | 1.0 | 1.1 |
| Evaluation | o | x | x |
| Toner Fixation | o | o | Δ |
| Writing Quality | o | o | x |
| Ease of Detecting a Stuck Film | o | o | x |
| Overall Evaluation | o | x | x |

o: Good (acceptable)
Δ: Fair
x: Unsuitable (rejected)

EXAMPLE 3

18 parts by weight of U-Polymer (the trade name for a polyarylate resin manufactured by UNITIKA Ltd., having a UL temperature index of at least 120° C.) was dissolved in 82 parts by weight of methylene chloride, and the solution was cast on a casting drum to form a film 100μ thick. Both sides of the film were coated with a solution comprising 100 parts by weight of Ester Resin No. 200, trade name for condensed polyester resin comprising a copolymer of isophthalic acid, terephthalic acid and ethylene glycol, manufactured by Toyobo Co., Ltd., Japan, dissolved in a mixture of 500 parts by weight of methylene chloride and 500 parts by weight of methyl ethyl ketone together with 50 parts by weight of starch as a water-soluble substance and 15 parts by weight of silica as a matting agent, and the coating was dried to give a thickness of 10μ. The film thus-coated with a matte layer had a surface roughness of 5.6μ, and assured high pencil-writing quality, high ink receptivity and quick drying of ink. The film had an opacity of 51%.

The performance of the film was compared with that of the conventional matted and unmatted polycarbonate films. The results are shown in Table III below.

TABLE III

| | Polyarylate Matte Film | Polycarbonate Matte Film | Unmatted Polycarbonate Film |
|---|---|---|---|
| Thickness (μ) | 100 | 100 | 100 |
| Matte Surface Roughness (μ) | 5.6 | 4.1 | 0.1 |
| Opacity (%) | 51 | 50 | Measurement Impossible |
| Rippling | o | x | x |
| Dimensional Change (%): | | | |
| Longitudinal | 0.05 | 0.85 | 1.2 |
| Transverse | 0.03 | 0.71 | 1.0 |
| Evaluation | o | x | x |
| Toner Fixation | o | o | Δ |
| Writing Quality | o | Δ | x |
| Ease of Detecting s Stuck Film | o | o | x |
| Overall Evaluation | o | x | x |

o: Good (acceptable)
Δ: Fair
x: Unsuitable (rejected)

While the invention has been described in detail and with reference to specific embodiments thereof, it will be apparent to one skilled in the art that various changes and modifications can be made therein without departing from the spirit and scope thereof.

What is claimed is:

1. A transfer film for use in electrophotographic copiers comprising a matted plastic film having a UL temperature index of at least 120° C. and at least one side of which has a surface roughness of at least 1.0 micron, said plastic film comprising a resin selected from the group consisting of a polysulfone resin, a polyarylate resin having repeated units represented by the formula

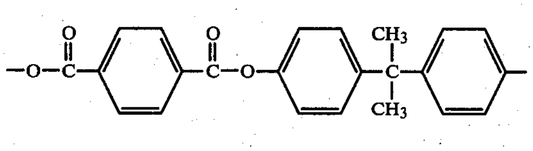

and a chlorinated polycarbonate resin, said transfer film having an opacity of from 20 to 65%.

2. A transfer film according to claim 1, wherein the film thickness is in the range of from about 25 to 100 microns.

3. A transfer film according to claim 2, wherein the film thickness is in the range of 35 to 80 microns.

4. A transfer film according to claim 1, wherein the film has an opacity of from 25 to 55%.

5. A transfer film according to claim 1 wherein said plastic film comprises said polysulfone resin.

6. A transfer film according to claim 5 wherein said polysulfone resin comprises polyether sulfone resin.

7. A transfer film according to claim 1 wherein said plastic film comprises said polyarylate resin.

8. A transfer film according to claim 1 wherein said plastic film comprises said chlorinated polycarbonate resin.

9. A transfer film according to claim 1, wherein said plastic film comprises said polysulfone resin which has repeating units represented by the formula

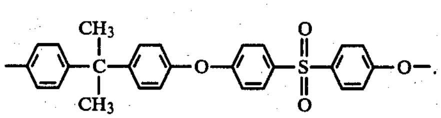

10. A transfer film according to claim 1, wherein said plastic film comprises said polysulfone resin which has repeating units represented by the formula

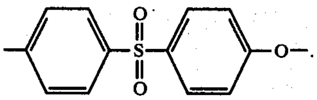

11. A transfer film according to claim 1, wherein said polyarylate resin has a UL temperature index of about 130° to 140° C.

* * * * *